United States Patent [19] — Hoffmann et al.

[11] 3,985,724
[45] Oct. 12, 1976

[54] 1-(4'-DIAZONIUMPHENYL)-PYRIDINIUM SALTS AND THE PROCESS OF PREPARATION

[75] Inventors: Hermann Hoffmann; Byron G. Held; Harry E. Green; Harold E. Van Essen, all of Charles City, Iowa

[73] Assignee: Salsbury Laboratories, Charles City, Iowa

[22] Filed: Oct. 15, 1974

[21] Appl. No.: 514,664

[52] U.S. Cl. ................................ 260/141; 260/156
[51] Int. Cl.² ............... C07C 113/00; C09B 29/12; C09B 29/36; D06P 1/04
[58] Field of Search ............ 260/141, 290 R, 290 H, 260/290 P, 296 R, 294.8 F, 294.8 S, 156

[56] References Cited
UNITED STATES PATENTS

| | | | |
|---|---|---|---|
| 3,539,347 | 11/1970 | Rauhut | 260/141 X |
| 3,748,140 | 7/1973 | Frommeld et al. | 260/141 X |
| 3,804,823 | 4/1974 | Fisher et al. | 260/158 |

Primary Examiner—Floyd D. Higel
Assistant Examiner—John J. Doll
Attorney, Agent, or Firm—Henderson, Strom & Sturm

[57] ABSTRACT

Novel diazonium compounds and methods for their preparation are disclosed. Specifically, 1-(4'-diazoniumphenyl)-1,2-dihydro pyrid-2-imino-sulfinate is prepared by rearrangement of 2-(4'-diazobenzenesulfonylamino)-pyridine, and 1-(4'-diazoniumphenyl)-2-amino-pyridinium salts are obtained by reaction of 1-(4'-diazoniumphenyl)-1,2-dihydro-pyrid-2-imino-sulfinate with aqueous acids. The novel compounds are useful as precursors for azo dyestuffs.

7 Claims, No Drawings

1-(4'-DIAZONIUMPHENYL)-PYRIDINIUM SALTS AND THE PROCESS OF PREPARATION

BACKGROUND OF THE INVENTION

1. Field of the Invention

This invention relates to novel diazonium compounds and to methods of their preparation. The novel diazonium compounds of this invention are useful for many industrial purposes, particularly as precursors for azo dyestuffs having affinity for acrylic fabrics.

2. Description of the Prior Art

Many compounds have been utilized over the years as dyes for synthetic fibers. The art of preparing a dye for a particular application has been highly refined, such that those skilled in the art have a wide choice of compounds at their disposal, the selection of material in a given situation being dependent on such factors as the substrate to be dyed, the use to which it will be subjected, the color desired, cost, availability, etc.

There are many existing patents directed to dyes, and U.S. Pat. Nos. 3,785,769 and 3,803,122 are representative of this large body of prior art.

Nevertheless, there is a continuing need for new and improved materials in this field, and this invention provides novel compounds having utility in the production of such materials.

SUMMARY OF THE INVENTION

According to the present invention, new diazonium compounds and methods for their preparation are described.

The compound having the formula:

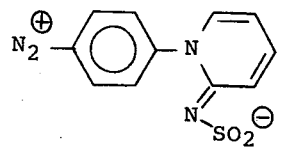

and referred to herein as 1-(4'-diazoniumphenyl)-1,2-dihydropyrid-2-imino-sulfinate is prepared from 2-(4'-diazobenzenesulfonylamino)-pyridine by what is thought to be an intramolecular nucleophilic substitution reaction of same in an aqueous medium at a pH of from 3 to 6 at low temperature.

The 1-(4'-diazoniumphenyl)-1,2-dihydro-pyrid-2-iminosulfinate prepared as in the preceding paragraph may be converted to 1-(4'-diazoniumphenyl)-2-aminopyridinium salts with elimination of sulfur dioxide by reaction with aqueous mineral acids.

Both 1-(4'-diazoniumphenyl)-1,2-dihydro-pyrid-2-iminosulfinate and 1-(4'-diazoniumphenyl)-2-aminopyridinium salts undergo the usual reactions of diazonium salts whereby dyestuffs having desired properties are produced by selection of appropriate coupling components.

DESCRIPTION OF THE PREFERRED EMBODIMENTS

It has been found that 1-(4'-diazoniumphenyl)-1,2-dihydropyrid-2-imino-sulfinate can be prepared from 2-(4'-diazobenzenesulfonylamino)-pyridine, by what is believed to be in intramolecular nucleophilic substitution reaction according to the following scheme:

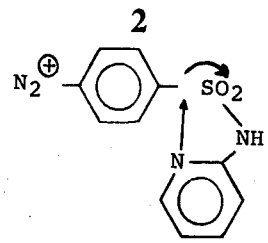

followed by deprotonation, to produce

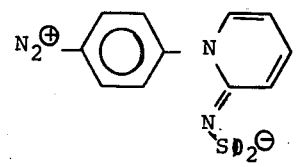

The reaction is carried out in an aqueous medium at a pH where the diazonium group of the starting material is present as such, i.e. has not collapsed to the diazotate, and where the pyridine nucleus is present as free base. This is the case when the reaction is carried out at a pH of from 3 to 6.

To avoid decomposition the reaction should be run at a temperature below 20°C. The conversion is sufficiently fast at lower temperatures, and takes place even as low as −15° C. The rate of the rearrangement reaction is not concentration-dependent, and the reaction may therefore be carried out within a wide range of concentrations, especially since the reaction product is only sparingly soluble in the reaction medium.

The starting material for the rearrangement reaction is a known compound, 2-(4'-diazobenzenesulfonylamino)-pyridine, which may be prepared by diazotization of sulfapyridine. It is formed as a salt in the diazotization reaction, for example as a hydrochloride or as a sulfate.

The rearrangement reaction may be carried out by adjusting the pH of an aqueous solution or of an aqueous suspension of the 2-(4'-diazobenzenesulfonylamino)-pyridine salt to a value of from 3 to 6. This may be done, for example, by addition of an alkali hydroxide, or an alkaline earth oxide or hydroxide, or by addition of a salt of an alkali metal or an alkaline earth metal with a weak acid such as carbonic acid or acetic acid. Ammonia or an ammonium salt also may be used. Alternatively, the solid starting material or an aqueous suspension or solution thereof may be added to the aqueous reaction medium, the pH of which is brought to and kept within the desired range by addition of one or more of the foregoing materials.

As previously mentioned, the product of the rearrangement reaction is only sparingly soluble in the reaction medium, and crystallizes out as it is produced. The reaction time is fairly short, generally from a few minutes to several hours being required for the reaction to be substantially complete. After the reaction is substantially complete and the resulting 1-(4'-diazoniumphenyl)-1,2-dihydro-pyrid-2-imino-sulfinate has crystallized out of the reaction medium, the product may be recovered by filtration and washed with water. In some cases, the filtration step is not necessary, and the product may be used for subsequent reactions as an aqueous crystal suspension of the product in the reaction medium.

EXAMPLE I

This Example illustrates the preparation of 1-(4'-diazoniumphenyl)-1,2-dihydro-pyrid-2-imino-sulfinate by rearrangement of 2-(4'diazobenzenesulfonylamino)-pyridine which was prepared by diazotization of sulfapyridine.

250 g (1.0 mol) sulfapyridine was dissolved in a mixture of 100 ml water, 400 g ice and 270 ml (2.7 mol) concentrated hydrochloric acid. This solution was added to a mixture of 2000 ml water and 2800 g ice; then a solution of 75.0 g (1.08 mol) sodium nitrite in 400 ml water was added at once. The diazonium salt crystallized after about 5 minutes. The solids were dissolved by bringing the volume of the mixture to 14 liters with ice water. After stirring for 0.5 hr at 0° C, the pH was adjusted to 5.1 with sodium acetate (about 1.7 mol) and the mixture stirred for another 2 hrs. The solids were then filtered and washed with 1 liter of cold water to give 543 wet 1-(4'-diazonium)-1,2-dihydro-pyrid-2-imino-sulfinate.

In the dry state this new compound is quite stable at room temperature. However, it decomposes violently at about 230° C.

This new compound, under the influence of aqueous mineral acids, is converted to 1-(4'-diazoniumphenyl)-2-amino-pyridinium salts with elimination of sulfur dioxide. The preferred acid concentration depends on the particular acid used. In the case of sulfuric acid, for example, the reaction is sufficiently fast at an acid concentration between 40 percent and 96 percent at a temperature from 0° to 20° C. In the case of hydrochloric acid a concentration in the range of 15 percent to 37 percent is adequate at 0° to 20° C. The resulting 1-(4'-diazoniumphenyl)-2-amino-pyridinium salt solutions are quite stable at room temperature.

EXAMPLE II

This Example illustrates the preparation of the sulfate salt of 1-(4'-diazoniumphenyl)-2-amino-pyridinium.

51.2 g (0.101 mol) sulfapyridine diazonium chloride (containing 42% moisture) was added to a stirred mixture of 300 g water, 300 g ice and 41.0 g sodium acetate. After stirring for 7 hrs at a temperature below 18° C the solids were filtered, washed with water and air dried to give 24.6 g (88.5%) 1-(4'-diazonium-phenyl)-1,2-dihydro-pyrid-2-imino-sulfinate.

0.05 mol 1-(4'diazoniumphenyl)-1,2-dihydro-pyrid-2-iminosulfinate was added within 20 minutes to 35 ml 95% sulfuric acid at a temperature below 20° C. Nitrogen was bubbled through the solution for 2.5 hrs to remove $SO_2$.

The chloride salt is conveniently prepared similarly to the above procedure, using from 15 to 37 percent hydrochloric acid in place of sulfuric acid.

The following Examples III – V illustrate the preparation of dyestuffs utilizing the novel compounds of the invention.

EXAMPLE III

The wet material (543 g) prepared in Example I was added within 0.5 hour at a temperature below 10° C to a mixture of 250 g (2.60 mol) phenol and 1.2 liter water while the pH of the mixture was kept at 11 by the addition of 50% sodium hydroxide (total: 208 g 50% sodium hydroxide). The mixture was stirred for 2 hrs at 10° C, filtered and washed with 1 liter of water to give 140 g 1-(4''-hydroxyphenylazophenyl-4')-1,2-dihydro-2-imino-pyridine, a red solid, m.p. 222°–4° C.

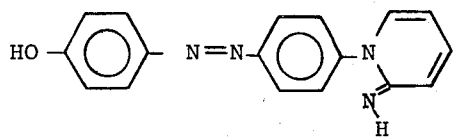

With aqueous hydrochloric acid the material is easily converted to 1-(4''-hydroxyphenylazophenyl-4')-2-amino-pyridinium chloride; absorption maximum in water: 353 mu.

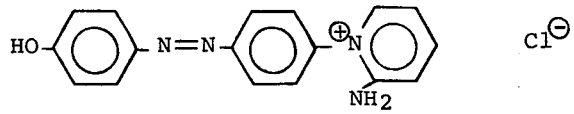

EXAMPLE IV

The solution obtained in Example II was poured on 150 g ice and the resulting mixture added to a mixture of 400 ml water, 200 g ice, 8.0 g N,N-dimethylaniline and 15 ml 95% sulfuric acid. During the next 1.5 hrs the pH of the solution was adjusted to 1.5 by the addition 98 g sodium bicarbonate. After stirring overnight the pH was adjusted to 6.5 with sodium bicarbonate, stirred for 2 hrs, filtered and washed with water. One obtained 9.3 g

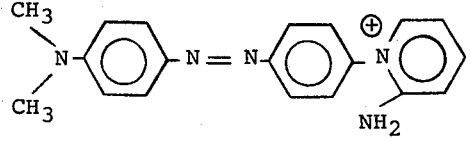

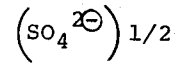

The hydrochloride of this material may be prepared by treating 1 g of the sulfate with 10 ml 5% sodium chloride solution. The pure hydrochloride (from 90% pyridine) has a melting point of 260°–2° C and an absorption maximum of 464 mu (water).

EXAMPLE V

This Example illustrates the preparation of 1-(4'-diazoniumphenyl)-1,2-dihydro-pyrid-2-imino sulfinate in accordance with the invention followed by preparation of an azo dyestuff utilizing the compound.

125 g (0.50 mol) sulfapyridine was added with stirring to 150 g water followed by the addition of 100 g ice and 125 g concentrated hydrochloric acid. After complete dissolution of the sulfapyridine the solution was poured into a mixture of 900 g water and 900 g ice and diazotized by adding under the surface a solution of 38 g (0.55 mol) sodium nitrite in 100 ml water. Sulfapyridine diazonium chloride precipitated and was stirred for 0.25 hrs. The pH was adjusted to 4.8 with 300 g sodium acetate trihydrate, the mixture stirred for 4 hrs, filtered, washed with cold water and air dried.

Yield: 137 g of 1-(4'-diazoniumphenyl)-1,2-dihydro-pyrid-2-imino-sulfinate.

27.8 g (0.10 mol) 1-(4'-diazoniumphenyl)-1,2-dihydro-pyrid-2-imino-sulfinate (moisture content: 6.5%) was added at 0° C within 30 minutes to a solution of 30.0 g (0.17 mol) 1-phenyl-3-methyl-3-pyrazolin-5-one and 25.0 g (0.31 mol) 50% sodium hydroxide in 200 ml water. Subsequently another 5.1 g (0.064 mol) 50 % sodium hydroxide was added and the mixture stirred for 2 hrs at 0° C (pH 12.0). The precipitated

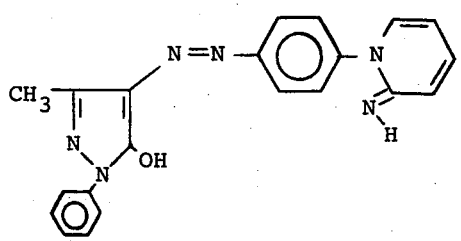

was then filtered off, washed several times with dilute sodium hydroxide (pH 11.0) and then with 100 ml water. Yield: 34.2 g (92.5%) air dried material.

The product was dissolved in 685 ml hot diluted hydrochloric acid (pH 3.3) and clarified after addition of 4.0 g charcoal. The pH was then adjusted to 1.0 with hydrochloric acid and the hydrochloride

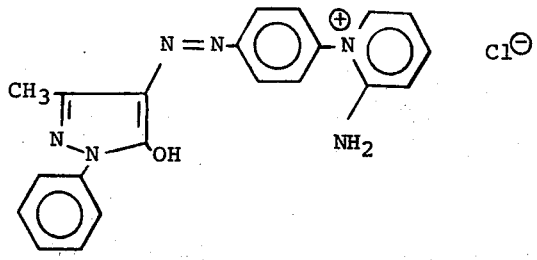

filtered at room temperature, washed with water and recrystallized from isopropanol. M.p. 179°–81° C, resolidification, decomposition at 303° C. Absorption maximum 383 mu (water).

Additional azo dyestuffs were prepared using procedures similar to those of Examples III–V, but utilizing other coupling components. Coupling components and their respective absorption maxima (at pH 5 in water) are given in the following table.

TABLE 1

| Coupling Component | Absorption Maxima (mu) |
|---|---|
| acetoacetanilide | 365 |
| salicylic acid | 365 |
| 2-hydroxy-3-naphthoic acid | 486 |
| 2,5-dimethylaniline | 400 |
| Beta-naphthol | 380 |

The above-noted dyestuffs have excellent affinity for synthetic fibers, and particularly for acrylic fabrics. It will be apparent to those skilled in the art that other coupling components could be utilized with the compounds of this invention to produce additional dyestuffs.

What is claimed is:
1. The compound 1-(4'-diazoniumphenyl)-1,2-dihydro-pyrid-2-imino-sulfinate.
2. The compound 1-(4'-diazoniumphenyl)-2-aminopyridinium chloride.
3. The compound 1-(4'-diazoniumphenyl)-2-aminopyridinium sulfate.
4. A process for preparing 1-(4'-diazoniumphenyl)-1,2-dihydro-pyrid-2-imino-sulfinate by rearrangement of 2-(4'-diazobenzenesulfonylamino)-pyridine comprising reacting said 2-(4'-diazobenzenesulfonylamino)-pyridine in an aqueous medium having a pH of from 3 to 6 at a temperature below 20° C for a time sufficient to substantially complete said rearrangement.
5. The process of claim 4 wherein, after said rearrangement is substantially complete, said 1-(4'-diazoniumphenyl)-1,2-dihydro-pyrid-2-imino-sulfinate is reacted with an aqueous mineral acid to produce a 1-(4'-diazoniumphenyl)-2-aminopyridinium salt.
6. The process of claim 5 wherein said aqueous mineral acid is hydrochloric acid.
7. The process of claim 5 wherein said aqueous mineral acid is sulfuric acid.

* * * * *